April 22, 1969 LE ROY A. PROHOFSKY ETAL 3,440,440

INPUT-OUTPUT CIRCUIT

Filed April 29, 1966

INVENTORS
LEROY A. PROHOFSKY
PETER R. TIERNEY

BY Griffin & Branigan
ATTORNEYS

United States Patent Office 3,440,440
Patented Apr. 22, 1969

3,440,440

INPUT-OUTPUT CIRCUIT

LeRoy A. Prohofsky, Minneapolis, and Peter R. Tierney, Bloomington, Minn., assignors to Sperry Rand Corporation, New York, N.Y., a corporation of Delaware Filed Apr. 29, 1966, Ser. No. 546,314
Int. Cl. H03k *19/08, 19/12*
U.S. Cl. 307—208 6 Claims This invention relates to electronic interconnection systems and more particularly to a system for coupling the output from a first electronic network to the input of a second electronic network.

The evolution of electronics has resulted in highly complex systems. Moreover, the electronic circuits and networks that make up the systems have become very complex. This complexity has resulted in the use of a multiplicity of wires and cables to interconnect both the networks of the systems as well as the systems themselves.

In addition, modern electronic systems operate at much lower signal voltages than previously developed systems. This reduction in voltage level has resulted in enhancing the detrimental effects of noise. Yet, due to the increase in system size, the amount of system generated noise has increased. Moreover, due to the increase in the number of interconnecting cables, the amount of cable cross-talk noise has increased. Hence, it is desirable to provide a system wherein the number of interconnection cables of a particular system is reduced and wherein the noise susceptibility of the interconnection system is reduced. This invention is concerned with such a system.

The prior art has attempted to solve the noise problem by providing shielding, by using twisted wire pairs in cables, and by utilizing complex differential amplifiers. However, these systems have not proven entirely satisfactory; they are generally expensive and complex. The use of twisted wire pairs in shielding has resulted in expensive, bulky cables. Further, prior art differential amplifiers are somewhat complex due to the use of a plurality of electronic components.

Therefore, it is an object of this invention to provide an electronic interconnection system that is less complex and less expensive than prior art systems.

It is a further object of this invention to provide an electronic interconnection system wherein the number of interconnecting wires is reduced.

It is also an object of this invention to provide an electronic interconnection system wherein the noise sensitivity of the system is reduced.

It is a still further object of this invention to provide an electronic interconnection system wherein the number of interconnecting wires is reduced, the noise sensitivity of the system is reduced, and the size and expense of the interconnecting wires is reduced.

The foregoing and other objects of the invention are accomplished by the provision of a cable connecting a plurality of input and output circuits together. The cable includes a single bias wire and a plurality of signal interconnecting wires. One end of each of the signal wires is connected to an output circuit. The output circuits could generate a pulse chain, for example. The end of the bias wire near the interconnection to the output circuits is connected to a source of bias potential. The other ends of the cable wires are connected to a plurality of input circuits. Specifically, the other end of each of the signal wires is connected to one input circuit. Further, the other end of the bias wire is connected to each of the plurality of input circuits.

According to a principle of the invention each of the input circuits includes a transistor wherein the base of the transistor is connected through a bias resistor to the bias wire. The signal wires are connected to the emitters of the transistor. Further, a resistor is cross connected between the emitter and the bias wire. As will be better appreciated from the following description, a transistor connected in this manner operates to provide an output at its collector which is an amplification of the difference between the signal and the bias voltages. Hence, this single transistor is a differential amplifier which eliminates noise common to the signal and bias wires.

The use of this simple differential amplifier and a system utilizing one common wire with a plurality of signal wires results in an inexpensive device that is smaller in size and less susceptible to noise than prior art devices. Moreover, the number of interconnecting wires is reduced.

The foregoing objects and many of the attendant advantages of the invention will become more greatly appreciated as the same becomes better understood by reference to the accompanying drawings wherein.

Figure 1:
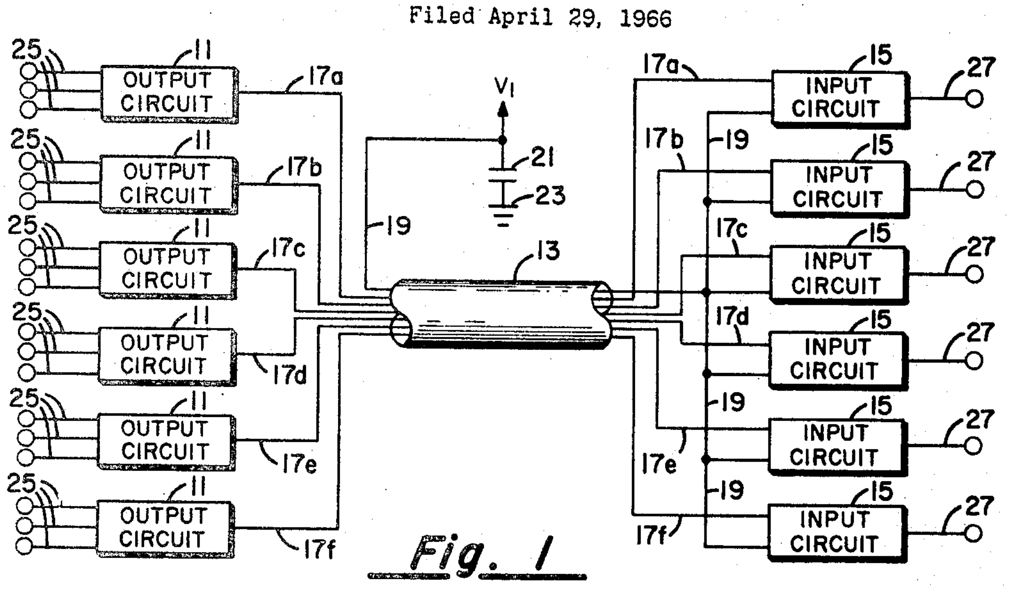
FIG. 1 is a block diagram of a preferred embodiment of the invention.

Turning now to the drawings, FIG. 1 illustrates a preferred embodiment of the invention and comprises a plurality of output circuits 11, a cable 13, and a plurality of input circuits 15.

The cable 13 comprises a plurality of signal wires 17*a–f* and a common bias wire 19. The bias wire 19 is connected to a voltage source $V_1$ at the end nearest the output circuits and this end of the bias wire is also connected through a capacitor 21 to ground 23. The capacitor grounds any AC voltage from the source $V_1$. The other end of the bias wire 19 is commonly connected to each of the input circuits 15.

FIG. 1 further illustrates a plurality of inputs 25 applied to each of the output circuits 11. In addition, an output 27 is obtained from each of the input circuits 15.

It will be appreciated that the system illustrated in FIG. 1 results in a reduction in the interconnecting wires between the output circuits 11 and the input circuits 15. Specifically, a single bias or return wire is utilized that is common to all of the signal wires; prior art systems have utilized a return wire for each signal wire. By containing all of the wires 17 and 19 inside of a common cable 13 any noise generated exterior to the cable will be common to all of the wires. Moreover, internally generated noise or cross talk from one of the wires will be common to the other wires as well as the common bias wire 19. More specifically, if a signal is being propagated down wire 17*a* it may create noise on wires 17*b–f*; however, this cross talk will also be created on wire 19. Hence, this undesirable signal on the wires 17*b–f* will also be common to wire 19. As will be better understood from the following description of the preferred embodiments of the input and output circuits, the invention eliminates or reduces the effect of these types of noise.

Figure 2:
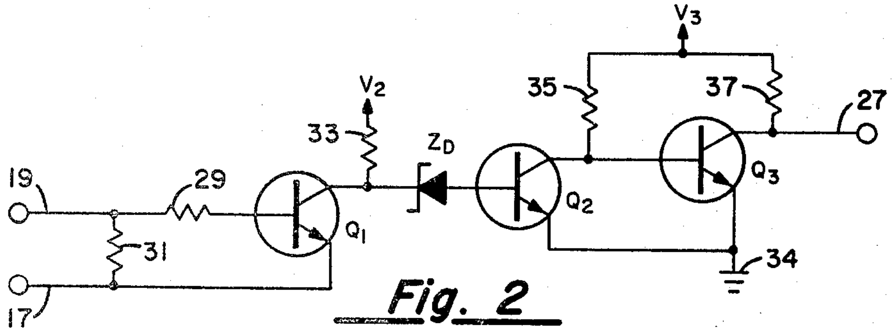
FIG. 2 is a preferred embodiment of the input circuit of the invention.

FIG. 2 illustrates a preferred embodiment of the input circuit 15 of FIG. 1. The circuit illustrated in FIG. 2 comprises a first transistor $Q_1$, a Zener diode $Z_D$, a second transistor $Q_2$, and a third transistor $Q_3$. The base of the first transistor $Q_1$ is connected through a base resistor 29 to the bias wire 19 and the emitter of the first transistor $Q_1$ is connected to one of the signal wires 17. Further, a resistor 31 is connected between the bias wire 19 and the signal wire 17. In addition, a bias resistor 33 is connected between a bias source $V_2$ and the collector of transistor $Q_1$.

The Zener diode $Z_D$ is connected between the collector of the first transistor and the base of the second transistor $Q_2$ and the collector of the second transistor is connected to the base of the third transistor $Q_3$. The emitters of the second and third transistors are connected together and to a ground 34. The collector of the second transistor is connected through a bias resistor 35 to a bias source $V_3$. Similarly, the collector of the third transistor is connected through a bias resistor 37 to the bias source $V_3$. Finally, an output terminal 27 is connected to the collector of the third transistor $Q_3$.

The first transistor $Q_1$ of the configuration illustrated in FIG. 2 operates as a differential amplifier. Specifically, the voltage at the collector will be an amplification of the difference in voltages of the signals applied to the base and the emitter. Hence, common mode voltage changes at the emitter and base will not cause a change at the collector output. More specifically, the bias wire 19, and the signal wire 17 are both included in the same cable and are therefore both subject to the same noise pickup. This common mode noise is applied to both the base and the emitter of the first transistor $Q_1$ causing the same voltage change at both the base and the emitter. However, due to the differential amplification this common change does not cause the voltage at the collector to change. Hence, this input circuit reduces the overall system's susceptibility to noise.

Figure 3:
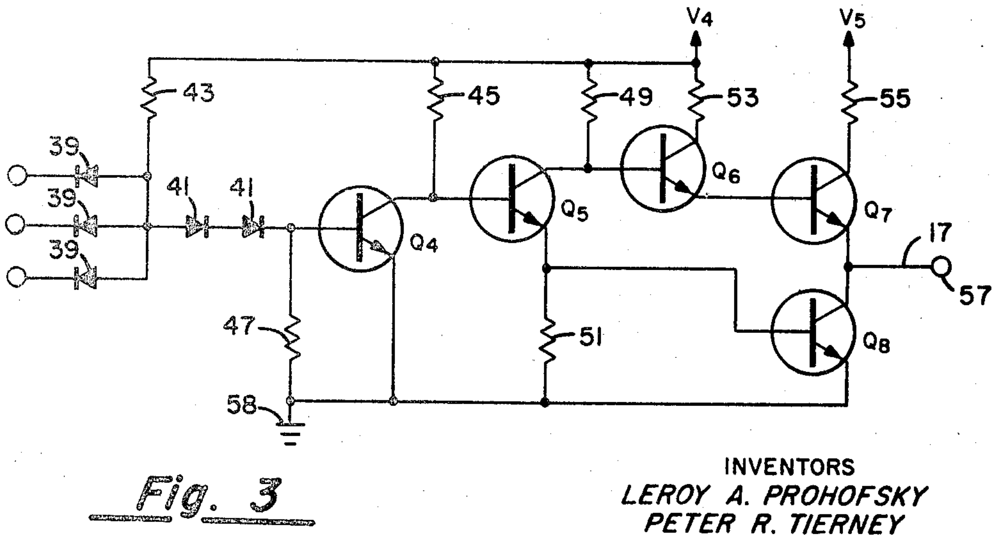
FIG. 3 is a preferred embodiment of the output circuit of the invention.

The output circuit illustrated in FIG. 3 comprises a plurality of input diodes 39, dual coupling diodes 41, a fourth transistor $Q_4$, a fifth transistor $Q_5$, a sixth transistor $Q_6$, a seventh transistor $Q_7$, and an eighth transistor $Q_8$. The cathodes of the input diodes 39 are adapted for connection to various signal sources and the anodes of the input diodes are connected together. The dual coupling diodes are connected in series between the anodes of the input diodes and the base of the fourth transistor $Q_4$. The anodes of the input diodes are also connected through a bias resistor 43 to a bias source $V_4$. Further, the collector of the fourth transistor is connected through a bias resistor 45 to the bias source $V_4$. The emitter of the fourth transistor $Q_4$ is connected to ground and the base of the fourth transistor $Q_4$ is connected through a resistor 47 to a ground 58.

The collector of the fourth transistor is connected to the base of the fifth transistor $Q_5$ and the collector of the fifth transistor is connected through a bias resistor 49 to the bias source $V_4$. The emitter of the fifth transistor is connected through a resistor 51 to the ground 58.

The collector of the fifth transistor is connected to the base of the sixth transistor $Q_6$ and the collector of the sixth transistor is connected through a bias resistor 53 to the bias source $V_4$. The emitter of the sixth transistor is connected to the base of the seventh transistor $Q_7$ and the emitter of the fifth transistor $Q_5$ is connected to the base of the eighth transistor $Q_8$. The emitter of the seventh transistor $Q_7$ is connected to the collector of the eighth transistor $Q_8$ and the emitter of the eighth transistor is connected to ground 58. Further, the collector of the seventh transistor is connected through a bias resistor 55 to a voltage source $V_5$. Finally, an output terminal 57 is connected between the emitter of the seventh transistor and the collector of the eighth transistor.

The ground 58 of the output circuit is independent of the ground 34 of the input circuit. Preferably the output circuit ground is a finite length and extends between the input and output circuits.

The circuit illustrated in FIG. 3 is a conventional gating circuit wherein the occurrence of an output voltage at the output terminal 57 depends upon the condition of the input signals. Specifically, if any or all of the input diodes 39 are grounded the fourth transistor $Q_4$ is turned off. Turning off the fourth transistor turns on the fifth transistor $Q_5$; this in turn turns off the sixth transistor $Q_6$ and turns off the seventh transistor $Q_7$. Further, turning on transistor $Q_5$ turns on transistor $Q_8$. The end result of this condition is that the output terminal is at ground potential since transistor $Q_8$ is turned on. Hence, no output signal is generated.

In the alternative, if none of the inputs are grounded the fourth transistor $Q_4$ is turned on. Turning on transistor $Q_4$ turns off the fifth transistor $Q_5$ which in turn turns on the sixth transistor $Q_6$ which turns on the seventh transistor $Q_7$. Further, with transistor $Q_5$ turned off transistor $Q_8$ is also turned off. The result under this condition is that a positive output signal is generated. Hence, the circuit illustrated in FIG. 3 is a conventional AND gating circuit wherein an output is generated only when a signal is applied to all of the inputs. However, it will be appreciated by those skilled in the art that this circuit is merely exemplary and that an OR gate or other logic gates could be utilized as well.

As a general rule, in order to have a balanced noise signal on two wires caused by a signal from a third wire or from an external source, the source impedance of the wires must be equal. The configuration of the input and output circuits illustrated in FIGS. 2 and 3 respectively are based on this requirement.

Specifically, since the source impedance of the bias supply is zero the signal source impedance must also be zero. The circuit illustrated in FIG. 3 provides this result since the circuit has a zero source impedance for positive noise signals when $Q_8$ is on (a zero output is occurring) and for negative noise signals when $Q_7$ is on (when a positive output is generated). For the opposite polarity noise signals the output circuit presents a high impedance. However, this high impedance does not adversely affect the differential operation of the input circuit. This can best be understood by considering the case when $Q_7$ is turned on. Under this condition the first transistor $Q_1$ of the input circuit is held off. That is, a positive signal is applied to the emitter of that transistor which reverse biases the transistor turning it off. A positive noise signal sees a high source impedance and therefore adds to the positive signal from the output circuit. This addition results in a common mode unbalance but the direction of the unbalance is to bias the transistor $Q_1$ further off. Hence, the unbalance does not adversely affect the operation of the invention.

A negative noise signal, with the seventh transistor $Q_7$ on, sees a zero source impedance resulting in a zero noise differential at the input circuit. Hence, there is no change in the voltage at the collector of the first transistor $Q_1$.

A similar situation exists for the case when the eighth transistor $Q_8$ is on. Under that condition the output signal is at ground potential turning on the first transistor $Q_1$ of the input circuit; that is, the emitter of $Q_1$ is grounded. A positive noise signal sees a zero source impedance resulting in a zero noise differential at the input circuit. Hence, the output remains unchanged. A negative noise signal results in an unbalance; however, the unbalance drives the emitter below ground thereby causing no change in its collector voltage.

It will be appreciated by those skilled in the art that the number of wires contained in the common cable will determine the noise unbalance between the signal wire and the bias wire. That is, even though both signal and bias wires pick up cross talk the proximity of the signal and bias wires to the wire creating the cross talk is different resulting in different voltages at the signal and bias wires. Further, unequal termination resistance between the signal and bias wires results in a noise unbalance. This unequality is due to the different resistances at the base and emitter of the first transistor $Q_1$. However, it has been found that six signal wires carrying 3–4 volt signals twisted around a seventh or bias wire does not result in an unacceptable amount of noise unbalance. Consequently, even though the system does not totally eliminate noise problems it greatly reduces them. Specifically, a 3:1 improvement in noise susceptibility has been found with a seven wire cable.

The foregoing description has illustrated a device wherein the multiplicity of interconnection wires between output and input circuts is reduced through the utilization of a common bias wire for a plurality of signal wires. Further, the use of a simple and uncomplicated differential amplifier as the first portion of the input circuit results in a device that reduces the noise susceptibility of the overall system. However, it will be appreciated by those skilled in the art that various changes may be made without departing from the scope of the invention. Specifically, the transistors have all been disclosed as appropriately biased NPN devices, but it will be appreciated that PNP transistors may also be utilized. Further, the output circuit has been described as an AND gate, but an OR gate or other logic circuitry could be used as well. The only requirement is that the output circuit have a source impedance similar to the bias impedance to prevent unbalance between the signal and bias wires when said unbalance creates a differential voltage which has an effect on the differential circuit. However, as illustrated above, when the unbalance causes no such effect the requirement for similar source and load impedances does not have to be met. The requirement for similar impedances is not to be considered absolute, since the system will perform satisfactorily without similar impedances.

The embodiments of the invention in which an exclusive property or privilege is claimed are defined as follows:

We claim:

1. An electrical signal cable transmission apparatus comprising:
- a transmission cable including a bias wire and a plurality of signal wires each having first and second ends;
- a plurality of output circuits;
- the first end of each of said signal wires connected to one of said output circuits;
- the first end of said bias wire adapted for connection to a source of bias voltage;
- a plurality of input circuits;
- the second end of each of said signal wires connected to one of said plurality of input circuits; and
- the second end of said bias wire connected to all of said plurality of input circuits.

2. Apparatus as claimed in claim 1 wherein each of said input circuits includes:
- a first transistor;
- a first resistor connected between the base of said first transistor and the second end of said bias wire;
- a second resistor connected between the emitter of said first transistor and the second end of said bias wire;
- the emitter of each of said first transistors of said input circuits connected to the second end of one of said signal wires; and
- the collector of said first transistor adapted for connection to a source of voltage.

3. Apparatus as claimed in claim 2 wherein said input circuit further includes:
- a second transistor;
- a third transistor;
- the collector of said first transistor connected to the base of said second transistor;
- the collector of said second transistor connected to the base of said third transistor;
- the emitters of said second and third transistors connected together and adapted for connection to ground;
- the collectors of said second and third transistors adapted for connection to a bias source; and
- an output terminal connected to the collector of said third transistor.

4. Apparatus as claimed in claim 3 wherein a Zener diode is connected between the collector of said first transistor and the base of said second transistor.

5. Apparatus as claimed in claim 4 wherein each of said output circuits comprises an AND gate.

6. Apparatus as claimed in claim 5 wherein each of said AND gates comprises:
- a plurality of input diodes;
- a plurality of switching transistors for generating an output voltage only when a signal is applied to all of said input diodes; and
- means for connecting said plurality of input diodes to said plurality of switching transistors.

References Cited

UNITED STATES PATENTS

| | | | |
|---|---|---|---|
| 3,121,840 | 2/1964 | Lamb | 340—18 X |
| 3,140,405 | 7/1964 | Kolling | 307—208 |
| 3,179,904 | 4/1965 | Paulsen | 333—1 |
| 3,227,997 | 1/1966 | Lamb et al. | 340—18 |

ARTHUR GAUSS, *Primary Examiner.*

DONALD D. FORRER, *Assistant Examiner.*

U.S. Cl. X.R.

307—215, 218, 241, 231, 270; 328—216; 330—69; 333—12